United States Patent Office 3,749,728
Patented July 31, 1973

3,749,728
N-CYCLOALKYL AND N-CYCLOALKANE-
ALKYLTHIOAMIDES
Bernard Loev, Broomall, Pa., assignor to Smith Kline &
French Laboratories, Philadelphia, Pa.
No Drawing. Filed Feb. 15, 1972, Ser. No. 226,531
Int. Cl. C07d 31/50
U.S. Cl. 260—294.8 E    5 Claims

ABSTRACT OF THE DISCLOSURE

The compounds are N-cycloalkyl and N-cycloalkane-alkyl thioamides, for example N-cyclopropyl and N-cyclopropanemethyl 2-(2-pyridyl)thioacetamide, which are inhibitors of gastric acid secretion.

---

This invention relates to new N-cycloalkyl and N-cycloalkanealkyl thioamides having pharmacological activity. In particular, these compounds inhibit gastric acid secretion.

The compounds of this invention are represented by the following formula:

FORMULA I

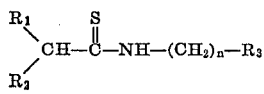

in which:

$R_1$ is a 2-pyridyl, 2-pyrimidyl, 4-pyrimidyl, 2-pyrazinyl, 2-pyrrolyl, 2-quinolyl, 2-thiazolyl or 4-thiazolyl ring, said rings being optionally substituted by halogen, lower alkyl or lower alkoxy;

$R_2$ is hydrogen, lower alkyl, lower alkenyl or phenyl, said phenyl being optionally substituted by halogen, lower alkyl or lower alkoxy;

$R_3$ is cycloalkyl having 3 to 6 carbon atoms and $n$ is 0 or 1 and a pharmaceutically acceptable acid addition salt thereof.

Preferred compounds of this invention are represented by Formula I in which $R_2$ is hydrogen or lower alkyl and $R_3$ is cyclopropyl.

Advantageous compounds of this invention are represented by Formula I in which $R_1$ is 2-pyridyl, $R_2$ is hydrogen or lower alkyl and $R_3$ is cyclopropyl.

Particularly advantageous compounds of this invention are N-cyclopropyl-2-(2-pyridyl)thioacetamide and N-cyclopropanemethyl-2-(2-pyridyl)thioacetamide.

The compounds of this invention produce inhibition of gastric acid secretion. This activity is demonstrated by administration to pylorus ligated rats at doses of about 10 mg./kg. to about 50 mg./kg. orally. Also, this activity is demonstrated by administration to chronic gastric fistula rats (Brodie et al., Amer. J. Physiol. 202:812–814, 1962) at doses of about 10 mg./kg. to about 50 mg./kg. orally. In these procedures, compounds which produce an increase in gastric pH or a decrease in the volume of gastric juice or both are considered active.

The compounds of this invention are prepared by the following procedures:

I.

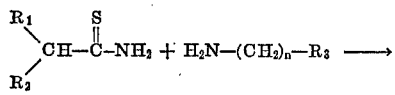

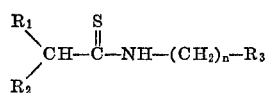

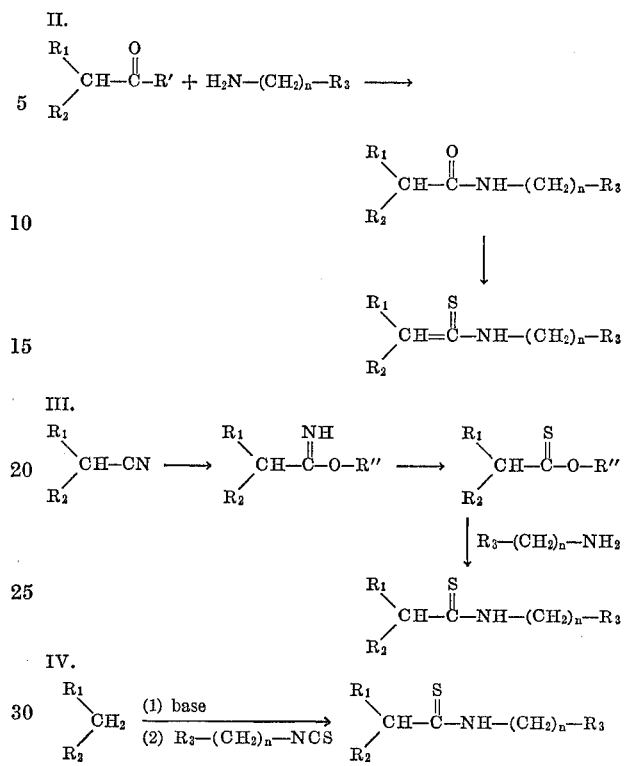

The terms $R_1$, $R_2$, $R_3$ and $n$ are as defined above, R' is methoxy, ethoxy or chloro and R" is methyl or ethyl.

According to procedure I, a substituted thioacetamide is reacted with a cycloalkyl or cycloalkanealkylamine to give the N-cycloalkyl or N-cycloalkanealkyl thioamides. The reaction is preferably carried out at elevated temperature, for example on a steam bath.

According to procedure II, a substituted acetic acid ester or chloride is reacted with a cycloalkyl or cycloalkanealkylamine and the resulting amide is converted to the corresponding thioamide by reacting with phosphorus pentasulfide.

By procedure III, a substituted acetonitrile is reacted with a lower alkanol and acid and the resulting substituted acetimidic acid ester is reacted with hydrogen sulfide to give a substituted thionoacetic acid ester which is then reacted with a cycloalkyl or cycloalkanealkylamine to give the N-substituted thioamides of this invention.

According to procedure IV, a methyl (or substituted methyl) heterocycle is reacted with strong base such as butyl lithium and then with a cycloalkyl or cycloalkane-cycloalkanealkyl thioamides of this invention.

The pharmaceutically acceptable, acid addition salts of the compounds of Formula I are formed with organic and inorganic acids by methods known to the art. For example, the base is reacted with an organic or inorganic acid in aqueous miscible solvent, such as acetone or cooling or in aqueous immiscible solvent, such as ethyl ethanol, with isolation of the salt by concentration and ether or chloroform, with the desired salt separating directly. Exemplary of the salts which are included in this invention are maleate, fumarate, succinate, oxalate, benzoate, methanesulfonate, ethanedisulfonate, benzenesulfonate, acetate, propionate, tartrate, citrate, hydrochloride, hydrobromide, sulfate, sulfamate, phosphate and nitrate salts.

The compounds of this invention are administered internally either parenterally, rectally or, preferably, orally in an amount to induce the desired biological activity.

Preferably, the compounds are administered in conventional dosage forms prepared by combining an appropriate dose of the compound witth standard pharmaceutical carriers.

The pharmaceutical carrier may be for example a solid or a liquid. Exemplary of solid carriers are lactose, magnesium stearate, terra alba, sucrose, talc, stearic acid, gelatin, agar, pectin, acacia or cocoa butter. The amount of solid carrier will vary widely but preferably will be from about 25 mg. to about 1 gm. Exemplary of liquid carriers are syrup, peanut oil, olive oil, sesame oil, propylene glycol, polyethylene glycol (mol. wt. 200–400) and water. The carrier or diluent may include a time delay material well known to the art such as, for example, glyceryl monostearate or glyceryl distearate alone or with a wax.

A wide variety of pharmaceutical forms can be employed, for example the preparation may take the form of tablets, capsules, powders, suppositories, troches, lozenges, syrups, emulsions, sterile injectable liquids or liquid suspensions or solutions.

The pharmaceutical compositions are prepared by conventional techniques involving procedures such as mixing, granulating and compressing or dissolving the ingredients as appropriate to the desired preparation.

The compounds of this invention will be administered in a daily dosage regimen of from about 10 mg. to about 2 g., preferably from about 25 mg. to about 1 g. Advantageously, equal doses will be administered one to four times per day. Dosage units will contain from about 10 mg. to about 500 mg., preferably from about 25 mg. to about 250 mg., of the active ingredient.

The terms "lower alkyl" and "lower alkoxy' where used herein denote groups having 1–6, preferably 1–4, carbon atoms; 'lower alkenyl' denotes groups having 2–6, preferably 2–4, carbon atoms and "halogen" denotes chloro, bromo or fluoro.

The following examples are not limiting but are illustrative of the compounds of this invention and processes for their preparation.

EXAMPLE 1

A solution of 7.6 g. (0.05 mole) of 2-(2-pyridyl)-thioacetamide in a 40% aqueous solution of cyclopropylamine is refluxed for 45 minutes. After cooling, approximately 30 ml. of water is added. The reaction mixture is extracted three times with chloroform. The extracts are combined and dried over magnesium sulfate. The solvent is removed under reduced pressure. The residue is recrystallized twice from ethyl acetate/hexane to give N-cyclopropyl - 2 - (2 - pyridyl)thioacetamide, M.P. 100–103° C.

EXAMPLE 2

Cyclopropanemethylamine hydrochloride, 6.02 g. (0.056 mole), and 4.71 g. of sodium bicarbonate (0.056 mole) are dissolved in 75 ml. of water and the solution is added to 4.35 g. (0.029 mole) of 2-(2-pyridyl)thioacetamide. The reaction mixture is heated on a steam bath with stirring for four hours. The mixture is then cooled and 25 ml. of water is added. The reaction mixture is extracted three times with chloroform. The chloroform extracts are combined, dried over magnesium sulfate and then evaporated. The residue is purified by "dry-column" chromatography on silica gel, using ethyl acetate as solvent. The product is recrystallized from ethyl acetate/ hexane to give N-cyclopropanemethyl - 2 - (2-pyridyl)-thioacetamide, M.P. 59–61° C.

EXAMPLE 3

By the procedure of Example 1, using in place of cyclopropylamine the following cycloalkylamines:

cyclobutylamine
cyclopentylamine
cyclohexylamine the products are, respectively:

N-cyclobutyl-2-(2-pyridyl)thioacetamide
N-cyclopentyl-2-(2-pyridyl)thioacetamide
N-cyclohexyl-2-(2-pyridyl)thioacetamide.

EXAMPLE 4

By the procedure of Example 2, using in place of cyclopropanemethylamine hydrochloride the following:

cyclobutanemethylamine hydrochloride
cyclopentanemethylamine hydrochloride
cyclohexanemethylamine hydrochloride the products are, respectively:

N-cyclobutanemethyl-2-(2-pyridyl)thioacetamide
N-cyclopentanemethyl-2-(2-pyridyl)thioacetamide
N-cyclohexanemethyl-2-(2-pyridyl)thioacetamide.

EXAMPLE 5

By the procedure of Example 1, using the following thioamides in place of 2-(2-pyridyl)thioacetamide:

2-(2-pyrazinyl)thioacetamide
2-(2-pyrrolyl)thioacetamide
2-(2-quinolyl)thioacetamide the products are, respectively:

N-cyclopropyl-2-(2-pyrazinyl)thioacetamide
N-cyclopropyl-2-(2-pyrrolyl)thioacetamide
N-cyclopropyl-2-(2-quinolyl)thioacetamide.

EXAMPLE 6

By the procedure of Example 2, using the following thioamides in place of 2-(2-pyridyl)thioacetamide:

2-(2-pyrazinyl)thioacetamide
2-(2-pyrrolyl)thioacetamide
2-(2-quinolyl)thioacetamide the products are, respectively:

N-cyclopropanemethyl-2-(2-pyrazinyl)thioacetamide
N-cyclopropanemethyl-2-(2-pyrrolyl)thioacetamide
N-cyclopropanemethyl-2-(2-quinolyl)thioacetamide.

EXAMPLE 7

By the procedure of Example 1, using in place of 2-pyridylthioacetamide the following thioamides:

3-methyl-2-(2-pyridyl)thiobutanamide
2-(2-pyridyl)thiopropanamide
2-(2-pyridyl)thiobutanamide
2-(2-pyridyl)thiopentanamide
2-(2-pyridyl)thiohexanamide
2-(2-pyridyl)thiooctanamide the products are, respectively:

N-cyclopropyl-3-methyl-2-(2-pyridyl)thiobutanamide
N-cyclopropyl-2-(2-pyridyl)thiopropanamide
N-cyclopropyl-2-(2-pyridyl)thiobutanamide
N-cyclopropyl-2-(2-pyridyl)thiopentanamide
N-cyclopropyl-2-(2-pyridyl)thiohexanamide
N-cyclopropyl-2-(2-pyridyl)thiooctanamide.

EXAMPLE 8

By the procedure of Example 2, using in place of 2-(2-pyridyl)thioacetamide the following thioamides:

3-methyl-2-(2-pyridyl)thiobutanamide
2-(2-pyridyl)thiopropanamide
2-(2-pyridyl)thiobutanamide
2-(2-pyridyl)thiopentanamide
2-(2-pyridyl)thiohexanamide
2-(2-pyridyl)thiooctanamide the products are, respectively:

N-cyclopropanemethyl-3-methyl-2-(2-pyridyl)thiobutanamide
N-cyclopropanemethyl-2-(2-pyridyl)thiopropanamide
N-cyclopropanemethyl-2-(2-pyridyl)thiobutanamide
N-cyclopropanemethyl-2-(2-pyridyl)thiopentanamide
N-cyclopropanemethyl-2-(2-pyridyl)thiohexanamide
N-cyclopropanemethyl-2-(2-pyridyl)thiooctanamide.

EXAMPLE 9

By the procedure of Example 1, using 2-(2-pyridyl)-4-thiopentenamide in place of 2-(2-pyridyl)thioacetamide, the product is N-cyclopropyl-2-(2-pyridyl)-4-thiopentenamide.

Using 2-(2-pyridyl)-4-thiopentenamide in place of 2-(2-pyridyl)thioacetamide in the procedure of Example 2, the product is N-cyclopropanemethyl-2-(2-pyridyl)-4-thiopentenamide.

EXAMPLE 10

Methyl 4-thiazolyl ketone (12.7 g.) is added to 3.8 g. of sodium borohydride in 100 ml. of isopropanol and the mixture is heated at reflux for four hours. Dilute hydrochloric acid (100 ml.) is added and the mixture is evaporated to dryness. The residue is dissolved in a small volume of water and the aqueous solution is made basic with 5% aqueous sodium bicarbonate solution, then evaporated to dryness. The residue is extracted with ether and the ether is removed from the extract in vacuo to give α-(4-thiazolyl)-ethanol.

A mixture of 8.4 g. of α-(4-thiazolyl)ethanol and 25 ml. of thionyl chloride is heated for four hours on a steam bath, then concentrated in vacuo. The residue is dissolved in water and basified with 5% aqueous sodium carbonate solution. Extracting with ether, then drying and concentrating the extracts gives 4-(α-chloroethyl)thiazole.

A solution of 7.8 g. of 4-(α-chloroethyl)thiazole is added dropwise to a suspension of 5.2 g. of sodium cyanide in 100 ml. of dimethylsulfoxide. The mixture is heated at 50° C. for two hours, then diluted with 150 ml. of a 5% aqueous sodium carbonate solution and extracted with ether. The extract is dried and concentrated to give α-(4-thiazolyl)propionitrile.

To 12.4 g. of α-(4-thiazolyl)propionitrile in 13 ml. of pyridine is added 5 ml. of triethylamine. Hydrogen sulfide is bubbled into the mixture for two hours. The mixture is heated in a sealed tube at 100° C. for 15 hours, then cooled and concentrated to dryness. The residue is extracted with chloroform and the extract is concentrated to dryness. The residue is recrystallized from chloroform-hexane to give 2-(4-thiazolyl)thiopropanamide.

Using 2-(4-thiazolyl)thiopropanamide in place of 2-(2-pyridyl)thioacetamide in the procedure of Example 1, the product is N-cyclopropyl-2-(4-thiazolyl)thiopropanamide.

By the procedure of Example 2, using 2-(4-thiazolyl)thiopropanamide in place of 2-(2-pyridyl)thioacetamide, the product is N-cyclopropanemethyl-2-(4-thiazolyl)thiopropanamide.

EXAMPLE 11

Alternatively, N-cyclopentyl - 2 - (2-pyridyl)thioacetamide is prepared by the following procedure.

Dry hydrogen chloride is bubbled through a solution of 1.4 ml. of absolute ethanol and 2.4 g. of 2-(2-pyridyl)-acetonitrile in 25 ml. of dry methylene chloride for 20 minutes. The reaction mixture is then cooled and dry ether is added with stirring. The precipitate is filtered off and washed with dry ether to give ethyl 2-(2-pyridyl) acetimidate hydrochloride.

Hydrogen sulfide is bubbled through a solution of the above prepared ethyl 2-(2-pyridyl)acetimidate hydrochloride in 20 ml. of pyridine and 2 ml. of triethylamine for one hour. The reaction mixture is stirred for another hour at room temperature. The triethylamine hydrochloride is filtered off and the filtrate is concentrated, then taken up in benzene and filtered. The filtrate is concentrated to give ethyl 2-(2-pyridyl)thionoacetate.

A solution of the above prepared thionoacetate and 1.8 g. of cyclopentylamine is stirred over an oil bath at 90–100° C. for 45 minutes. The reaction mixture is cooled, then taken up in chloroform and washed three times with water. The chloroform solution is concentrated and chromatographed on a silica gel "dry-column" eluting with 2:1 methanolacetonitrile to give N-cyclopentyl-2-(2-pyridyl)thioacetamide.

EXAMPLE 12

Alternatively, N-cyclopropanemethyl-2-(2-pyridyl)thiopropanamide is prepared by the following procedure.

A solution of 10.7 g. (0.1 mole) of 2-ethylpyridine in 50 ml. of anhydrous benzene is added dropwise at 25° C. to 8.7 g. (0.1 mole) of phenyl lithium in 100 ml. of anhydrous benzene. After the addition, the reaction is stirred for 30 minutes and 11.3 g. (0.1 mole) of cyclopropanemethyl isothiocyanate in 50 ml. of anhydrous benzene is added dropwise. The mixture is stirred at 25° C. for 15 hours, then decomposed with dilute hydrochloric acid. The layers are separated and the aqueous layer is basified with aqueous sodium carbonate solution. Extraction with ether, removal of the ether from the extract and recrystallization of the residue from isopropyl ether gives N-cyclopropanemethyl-2-(2-pyridyl)thiopropanamide.

EXAMPLE 13

To a solution of 22.2 g. of methyl magnesium chloride in ether is added 10.5 g. of 4-pyrimidinecarbonitrile in tetrahydrofuran. The resulting mixture is heated at reflux for 24 hours, then poured onto ice. To the mixture is added 75 ml. of 25% sulfuric acid. The solution is then made basic with 10% aqueous sodium carbonate solution and extracted with ether. The extracts are dried and concentrated to give methyl 4-pyrimidyl ketone.

By the procedure of Example 10, using methyl 4-pyrimidyl ketone in place of methyl 4-thiazolyl ketone, 2-(4-pyrimidyl)thiopropanamide is obtained.

Using 2-(4-pyrimidyl)thiopropanamide in place of 2-(2-pyridiyl)thioacetamide in the procedure of Example 1 gives N-cyclopropyl-2-(4-pyrimidyl)thiopropanamide.

By the procedure of Example 2, using 2-(4-pyrimidyl)-thiopropanamide in place of 2-(2-pyridyl)thioacetamide, the product is N-cyclopropanemethyl-2-(4-pyrimidyl)thiopropanamide.

EXAMPLE 14

By the procedure of Example 13, using 2-(4-chloropyridine)carbonitrile as the starting material, 2-(4-chloro-2-pyridyl)thiopropanamide is obtained.

Using 2-(4-chloro-2-pyridyl)thiopropanamide in place of 2-(2-pyridyl)thioacetamide in the procedures of Examples 1 and 2, the products are N-cyclopropyl-2-(4-chloro-2-pyridyl)thiopropanamide and N-cyclopropanemethyl-2-(4-chloro-2-pyridyl)thiopropanamide, respectively.

EXAMPLE 15

A solution of 11.8 g. of 2-pyridylacetonitrile in 30 ml. of dimethylsulfoxide is added to a suspension of 2.4 g. of sodium hydride in 50 ml. of dimethylsulfoxide with stirring. The mixture is heated on a steam bath for two hours, then cooled to room temperature. 2-methyl-2-pentenyl-1-chloride (11.8 g.) is added dropwise with stirring. The mixture is heated on a steam bath, with stirring, for 10 hours, then most of the solvent is removed in vacuo. Water is added to the residue, then 200 ml. of ether is added. The ethereal solution is separated from the aqueous layer and rinsed several times with water, then dried, concentrated and distilled to give 4-methyl-2-(2-pyridyl)-4-heptenenitrile.

Treating the above prepared nitrile with hydrogen sulfide by the procedure described in Example 10 gives 4-methyl-2-(2-pyridyl)-4-thioheptenamide.

Reacting 4-methyl-2-(2-pyridyl)-4-thioheptenamide with cyclopentylamine by the procedure of Example 1 gives N-cyclopentyl-4-methyl-2-(2-pyridyl)-4-thioheptenamide.

EXAMPLE 16

By the procedure described in Example 10, α-(6-methyl-2-pyridyl)-2-propenol is treated with thionyl chloride, the resulting 2-(1-chloro-2-propenyl)-6-methylpyridine is reacted with sodium cyanide and the resulting 2-(6-methyl-2-pyridyl)-3-butenenitrile is treated with hydrogen sulfide to give 2-(6-methyl-2-pyridyl)-3-thiobutenamide.

Using 2-(6-methyl-2-pyridyl)-3-thiobutenamide in place of 2-(2-pyridyl)thioacetamide in the procedure of Example 2 gives N-cyclopropanemethyl-2-(6-methyl-2-pyridyl)-3-thiobutenamide.

EXAMPLE 17

By the procedure of Example 1, using the following 2-(substituted 2-pyridyl)thioacetamides in place of 2-(2-pyridyl)thioacetamide:

2-(6-methyl-2-pyridyl)thioacetamide
2-(5-methyl-2-pyridyl)thioacetamide
2-(4-methyl-2-pyridyl)thioacetamide
2-(3-methyl-2-pyridyl)thioacetamide
2-(5-ethyl-2-pyridyl)thioacetamide
2-(4-methoxy-2-pyridyl)thioacetamide
2-(4-ethoxy-2-pyridyl)thioacetamide the products are, respectively:

N-cyclopropyl-2-(6-methyl-2-pyridyl)thioacetamide
N-cyclopropyl-2-(5-methyl-2-pyridyl)thioacetamide
N-cyclopropyl-2-(4-methyl-2-pyridyl)thioacetamide
N-cyclopropyl-2-(3-methyl-2-pyridyl)thioacetamide
N-cyclopropyl-2-(5-ethyl-2-pyridyl)thioacetamide
N-cyclopropyl-2-(4-methoxy-2-pyridyl)thioacetamide
N-cyclopropyl-2-(4-ethoxy-2-pyridyl)thioacetamide.

Using the above 2-(substituted-2-pyridyl)thioacetamides in place of 2-(2-pyridyl)thioacetamide in the procedure of Example 2 gives the corresponding N-cyclopropanemethyl compounds.

EXAMPLE 18

By the procedure of Example 1, using in place of 2-(2-starting materials:

2-phenyl-2-(2-pyridyl)thioacetamide
2-(4-chlorophenyl)-2-(2-pyridyl)thioacetamide
2-(2-fluorophenyl)-2-(2-pyridyl)thioacetamide
2-(3-methylphenyl)-2-(2-pyridyl)thioacetamide
2-(4-methoxyphenyl)-2-(2-pyridyl)thioacetamide
2-phenyl-2-(2-pyrazinyl)thioacetamide
2-(4-chlorophenyl)-2-(2-pyrimidyl)thioacetamide
2-phenyl-2-(2-thiazolyl)thioacetamide the products are, respectively:

N-cyclopropyl-2-phenyl-2-(2-pyridyl)thioacetamide
2-(4-chlorophenyl)-N-cyclopropyl-2-(2-pyridyl)thioacetamide
N-cyclopropyl-2-(2-fluorophenyl)-2-(2-pyridyl)thioacetamide
N-cyclopropyl-2-(3-methylphenyl)-2-(2-pyridyl)thioacetamide
N-cyclopropyl-2-(4-methoxyphenyl)-2-(2-pyridyl)thioacetamide
N-cyclopropyl-2-phenyl-2-(2-pyrazinyl)thioacetamide
2-(4-chlorophenyl)-N-cyclopropyl-2-(2-pyrimidyl)thioacetamide
N-cyclopropyl-2-phenyl-2-(2-thiazolyl)thioacetamide.

Using the above thioacetamide starting materials in the procedure of Example 2, the corresponding N-cyclopropanemethyl compounds are obtained.

EXAMPLE 19

Alternatively, N-cyclopropyl-2-(2-pyridyl)thioacetamide is prepared by the following procedure.

A mixture of 6 g. of cyclopropylamine, 16 g. of ethyl 2-(2-pyridyl)acetate and 50 ml. of ethanol is stirred at room temperature for three days. Volatile materials are then removed and the residue is distilled to give N-cyclopropyl-2-(2-pyridyl)acetamide.

To 1.9 g. of N-cyclopropyl-2-(2-pyridyl)acetamide in 25 ml. of pyridine is added 2.2 g. of phosphorus pentasulfide. The resulting mixture is heated on a steam bath for two hours, then 25 ml. of water is added. The mixture is extracted with chloroform and the extracts are dried and concentrated and the residue is recrystallized from isopropyl ether to give N-cyclopropyl-2-(2-pyridyl)thioacetamide.

EXAMPLE 20

By the procedure of Example 10, 2-(chloromethyl)thiazole is reacted with sodium cyanide to give 2-(2-thiazolyl)acetonitrile.

Using 2-(2-thiazolyl)acetonitrile in place of 2-(2-pyridyl)acetonitrile in the procedure of Example 11, the product is N-cyclopentyl-2-(2-thiazolyl)thioacetamide. Using cyclopropylamine in place of cyclopentylamine, the product is N-cyclopropyl-2-(2-thiazolyl)thioacetamide. Also, using cyclopropanemethylamine in place of cyclopentylamine, the product is N-cyclopropanemethyl-2-(2-thiazolyl)thioacetamide.

By the same procedures, using 4-(chloromethyl)thiazole, the following products are obtained:

N-cyclopentyl-2-(4-thiazolyl)thioacetamide
N-cyclopropyl-2-(4-thiazolyl)thioacetamide
N-cyclopropanemethyl-2-(4-thiazolyl)thioacetamide.

EXAMPLE 21

2-pyrimidinecarboxylic acid (15 g.) is suspended in 200 ml. of ethanol, and gaseous hydrogen chloride is bubbled in for three hours with stirring. The mixture is concentrated in vacuo and the residue is stirred with 5% aqueous sodium hydroxide solution and extracted with dichloromethane. The extract is dried and concentrated to give ethyl 2-pyrimidinecarboxylate.

Six grams of ethyl 2-pyrimidinecarboxylate in 50 ml. of diglyme is added slowly with stirring to a solution of 1 g. of sodium borohydride in 100 ml. of diglyme. Five milliliters of 2 molar aqueous aluminum chloride solution is added keeping the temperature below 50° C. The resulting mixture is stirred for one hour at room temperature, then one hour on a steam bath. The mixture is cooled and then poured onto a mixture of ice and concentrated hydrochloric acid. Solid sodium carbonate is added to bring the pH to 10, then the mixture is extracted with chloroform, dried and concentrated to give 2-pyrimidinemethanol.

The above prepared 2-pyrimidinemethanol is treated with thionyl chloride by the procedure of Example 10 to give 2-(chloromethyl)pyrimidine.

By the procedure of Example 10, 2-(chloromethyl)pyrimidine is reacted with sodium cyanide to give 2-(2-pyrimidyl) acetonitrile.

Using 2-(2-pyrimidyl)acetonitrile in place of 2-(2-pyridyl)acetonitrile and using cyclopropylamine in place of cyclopentylamine in the procedure of Example 11, the product is N-cyclopropyl-2-(2-pyrimidyl)thioacetamide. Using cyclopropanemethylamine in place of cyclopentylamine, the product is N-cyclopropanemethyl-2-(2-pyrimidyl)thioacetamide.

By the same procedures, using 4-pyrimidinecarboxylic acid, the following products are obtained:

N-cyclopropyl-2-(4-pyrimidyl)thioacetamide
N-cyclopropanemethyl-2-(4-pyrimidyl)thioacetamide.

EXAMPLE 22

One gram of N-cyclopropyl-2-(2-pyridyl)thioacetamide in ether is treated with ethereal hydrogen chloride and the resulting precipitate is filtered off to give N-cyclopropyl-2-(2-pyridyl)thioacetamide hydrochloride.

Similarly, treating N - cyclopropanemethyl - 2 - (2-pyridyl)thioacetamide with ethereal hydrogen chloride gives N-cyclopropanemethyl - 2 - (2 - pyridyl)thioacetamide hydrochloride.

In the same manner, using ethereal hydrogen bromide, the hydrobromide salts are prepared.

EXAMPLE 23

N - cyclopropyl - 2 - (2 - pyridyl)thioacetamide (500 mg.) in ethanol is treated with an equimolar amount of citric acid in ethanol to give, after removing the solvent in vacuo, N - cyclopropyl - 2 - (2-pyridyl)thioacetamide citrate.

By the same procedure, using maleic acid, the maleate salt of N-cyclopropyl-2-(2-pyridyl)thioacetamide is prepared.

In the other same manner, the citrate and maleate salts of N - cyclopropanemethyl-2-(2-pyridyl) thioacetamide are prepared.

What is claimed is:
1. A compound of the formula:

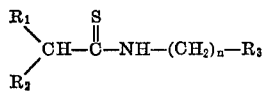

in which:
$R_1$ is a 2-pyridyl ring, said ring being optionally substituted by halogen, lower alkyl or lower alkoxy;
$R_2$ is hydrogen, lower alkyl, lower alkenyl or phenyl, said phenyl being optionally substituted by halogen, lower alkyl or lower alkoxy;
$R_3$ is cycloalkyl having 3 to 6 carbon atoms and $n$ is 0 or 1
or a pharmaceutically acceptable acid addition salt thereof.

2. A compound of claim 1 in which $R_2$ is hydrogen or lower alkyl and $R_3$ is cyclopropyl.

3. A compound of claim 1 in which $R_1$ is 2-pyridyl, $R_2$ is hydrogen or lower alkyl and $R_3$ is cyclopropyl.

4. A compound of claim 1 in which $R_1$ is 2-pyridyl, $R_2$ is hydrogen, $R_3$ is cyclopropyl and $n$ is 0.

5. A compound of claim 1 in which $R_1$ is 2-pyridyl, $R_2$ is hydrogen, $R_3$ is cyclopropyl and $n$ is 1.

References Cited
UNITED STATES PATENTS

| 3,290,318 | 12/1966 | Sause | 260—294.8 E |
| 3,624,085 | 11/1971 | Malen et al. | 260—294.8 E |
| 3,686,190 | 8/1972 | Malen et al. | 260—294.8 E |

ALAN L. ROTMAN, Primary Examiner

U.S. Cl. X.R.

260—250 R, 256.4 R, 283 S, 302 R, 325.5 S, 326.9; 424—250, 251, 258, 263 270, 274

UNITED STATES PATENT OFFICE
CERTIFICATE OF CORRECTION

Patent No. 3,749,728         Dated July 31, 1973

Inventor(s) Bernard Loev

It is certified that error appears in the above-identified patent and that said Letters Patent are hereby corrected as shown below:

Column 2, lines 14-16, that portion of the formula reading

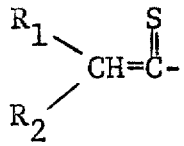   should read   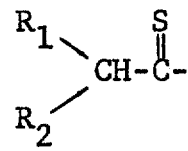

Column 2, lines 54-55, between lines 54 and 55 insert alkyl isothiocyanate to give the N-cycloalkyl and N-

Column 2, lines 61-62, interchange lines 61 and 62.

Column 7, following line 43 after "2-(2-" insert pyridyl)thioacetamide the following thioacetamides as Column 9, line 17, delete "other"

Signed and sealed this 9th day of April 1974.

(SEAL)
Attest:

EDWARD M. FLETCHER
Attesting Officer

C. MARSHALL DANN
Commissioner of Patents